Figure 1:
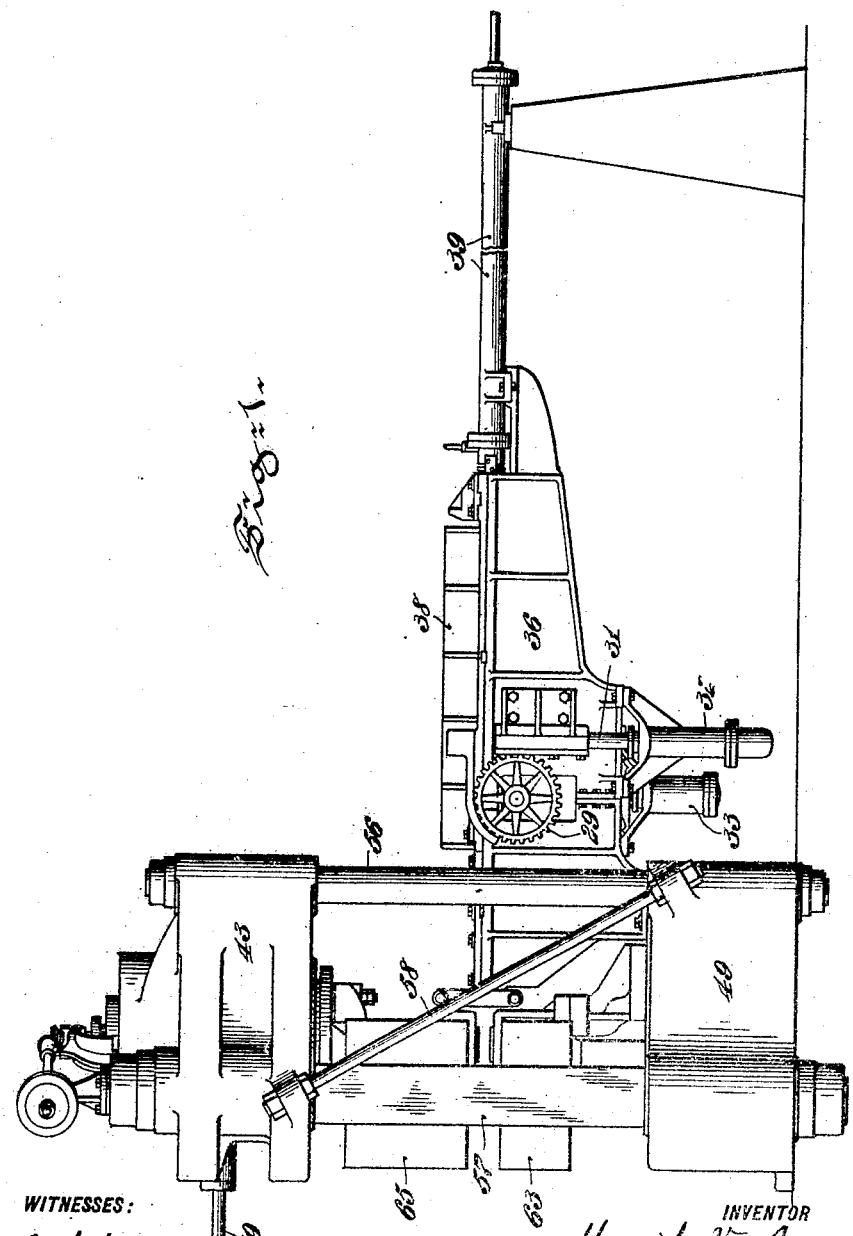

No. 891,626.  
H. V. LOSS.  
MACHINE FOR SHEARING METAL.  
APPLICATION FILED JULY 3, 1907.

PATENTED JUNE 23, 1908.

10 SHEETS—SHEET 1.

No. 891,626. PATENTED JUNE 23, 1908.
H. V. LOSS.
MACHINE FOR SHEARING METAL.
APPLICATION FILED JULY 3, 1907.

10 SHEETS—SHEET 5

WITNESSES:

INVENTOR
Henrik V. Loss
BY
Chas. A. Cutter
ATTORNEY.

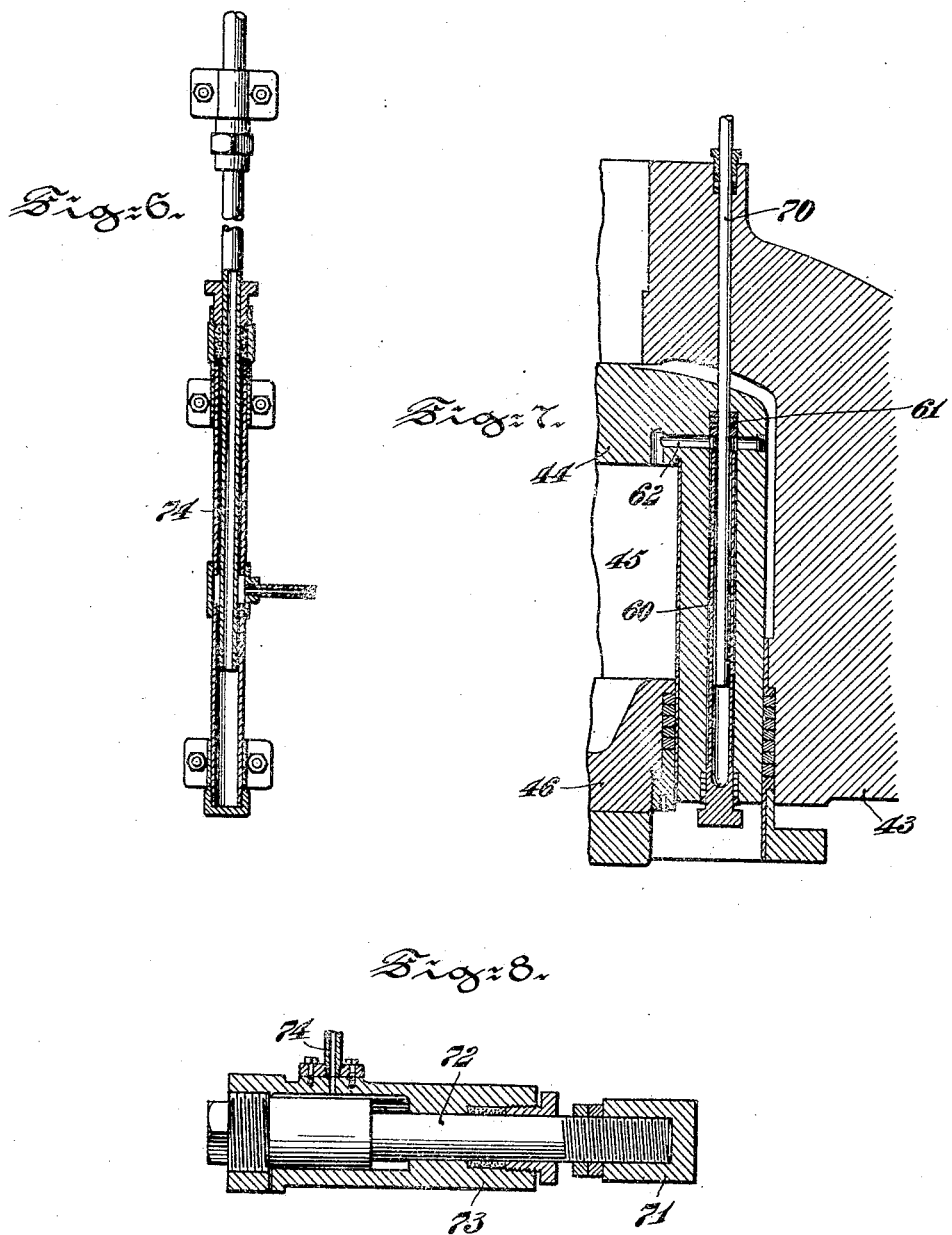

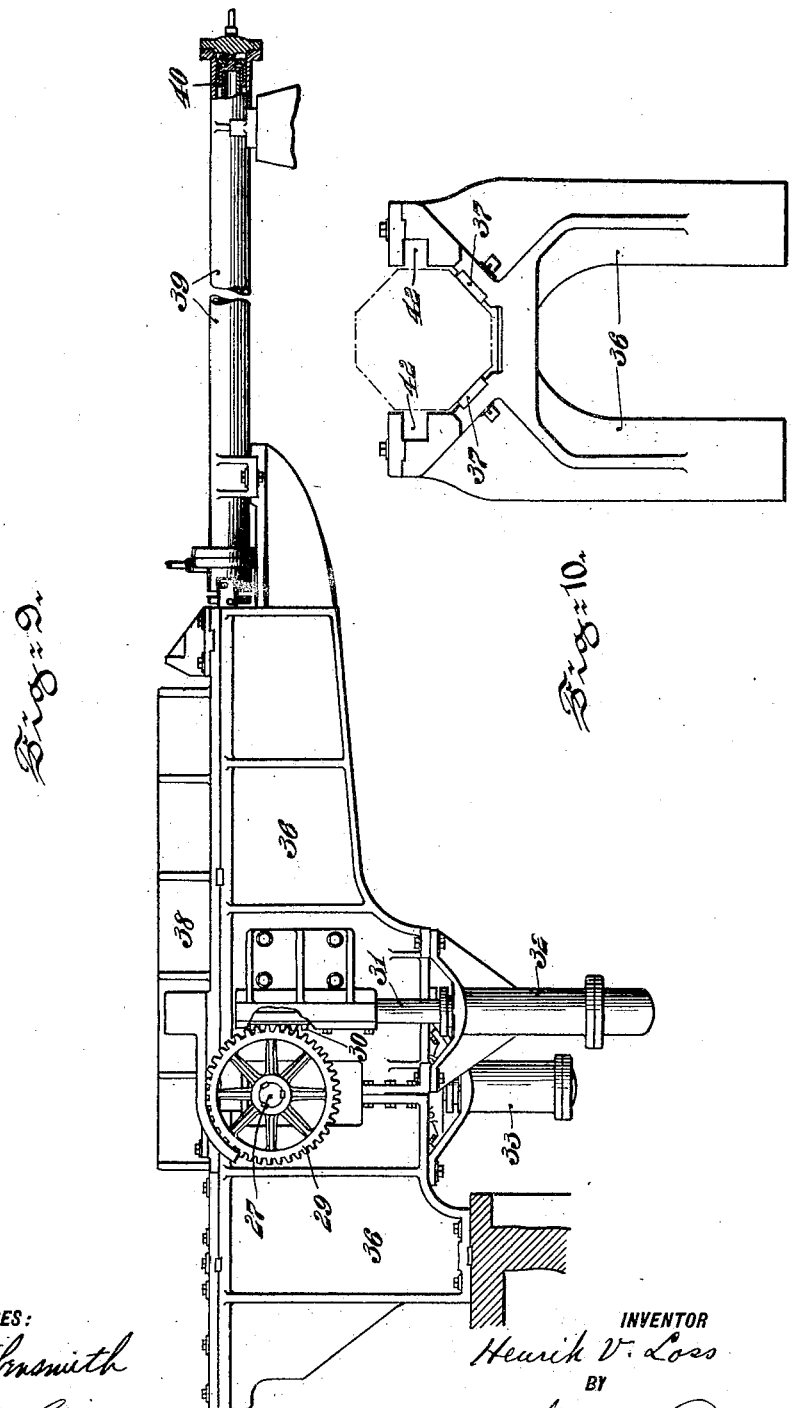

No. 891,626. PATENTED JUNE 23, 1908.
H. V. LOSS.
MACHINE FOR SHEARING METAL.
APPLICATION FILED JULY 3, 1907.
10 SHEETS—SHEET 8.
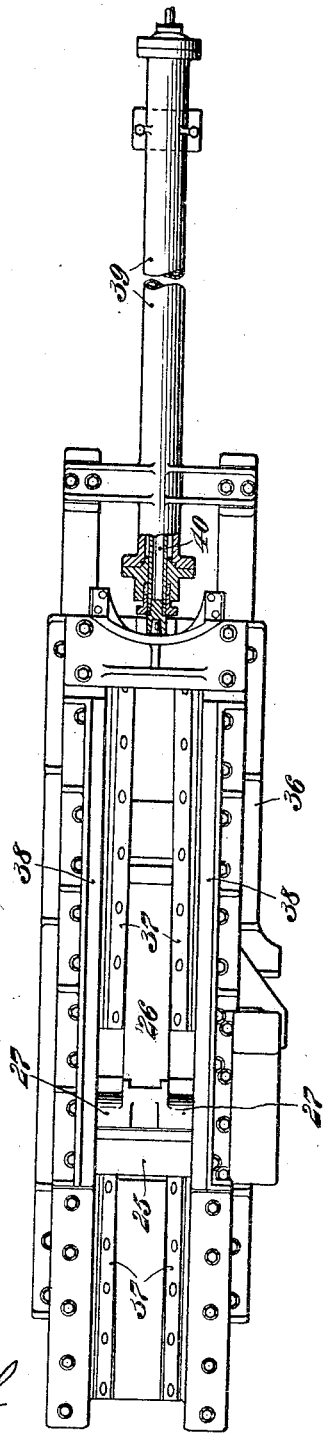
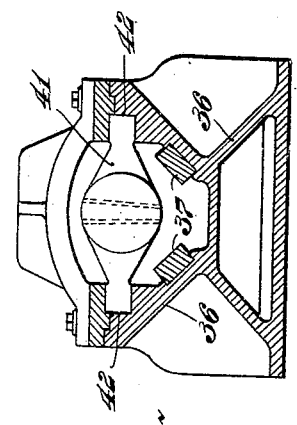
WITNESSES:
INVENTOR
Henrik V. Loss
BY
Chas. A. Cutter
ATTORNEY.

No. 891,626. PATENTED JUNE 23, 1908.
H. V. LOSS.
MACHINE FOR SHEARING METAL.
APPLICATION FILED JULY 3, 1907.
10 SHEETS—SHEET 9.
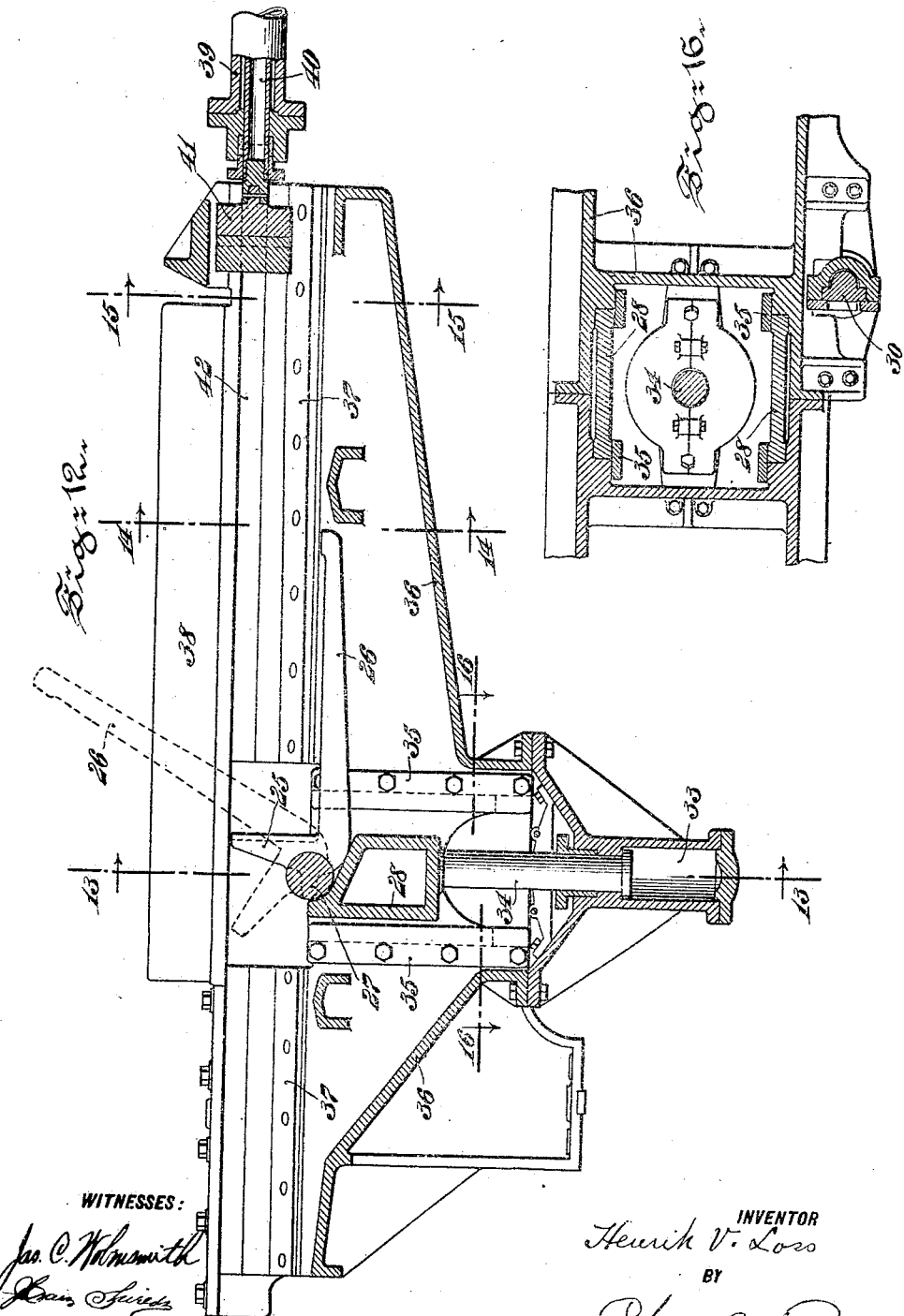
WITNESSES:
INVENTOR
Henrik V. Loss
BY
Chas. A. Ruttier
ATTORNEY.

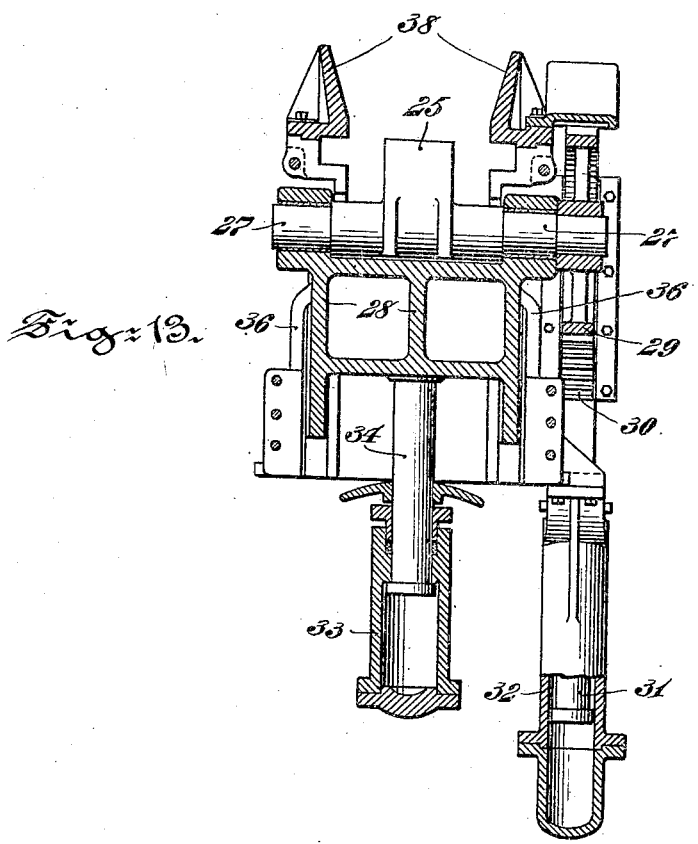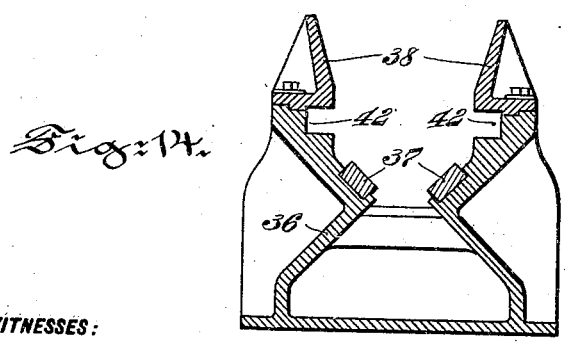

UNITED STATES PATENT OFFICE.

HENRIK V. LOSS, OF PHILADELPHIA, PENNSYLVANIA, ASSIGNOR TO CHARLES T. SCHOEN, OF MOYLAN, PENNSYLVANIA.

MACHINE FOR SHEARING METAL.

No. 891,626.

Specification of Letters Patent.

Patented June 23, 1908.

Application filed July 3, 1907. Serial No. 382,004.

*To all whom it may concern:*

Be it known that I, HENRIK V. LOSS, a citizen of the United States, and a resident of the city and county of Philadelphia, State of Pennsylvania, have invented certain new and useful Improvements in Machines for Shearing Metal, of which the following is a specification.

My invention relates to improvements in machines for shearing and forging metal, and more particularly solid metal articles of large cross section, as bars, billets, or ingots, the object of my invention being to furnish a process and machine by means of which the shearing may be accomplished without distorting or longitudinally dragging the metal at the shearing point; in other words to so shear the metal that the sheared sections will be approximately as true as if sawed with no rounded corners on the top or fins on the bottom.

In order to accomplish my end I make use of two principles, the first of which is to resist longitudinal flow of the metal in the article being sheared during the process of shearing by means of an external pressure which is applied practically all around the outside surface of article being operated upon and which, by the friction which will ensue between the article being sheared and the means for producing this pressure, will resist the flow of the metal in the article to be sheared; and the second of which consists in causing an offset in the line of the longitudinal flow of the metal during the shearing by means of pressure clamps which are sunk into the metal of the piece to be severed and which act as a barrier and a hindrance to said flow.

The pressure clamps in addition to performing the functions above mentioned also serve by their compression of the metal to forge it, their action being thus decidedly beneficial.

My invention is particularly designed for cutting from an ingot blanks to be used in the manufacture of car wheels, but I do not desire to confine my invention to this use as it is obvious that it might have many other applications.

Figure 2:
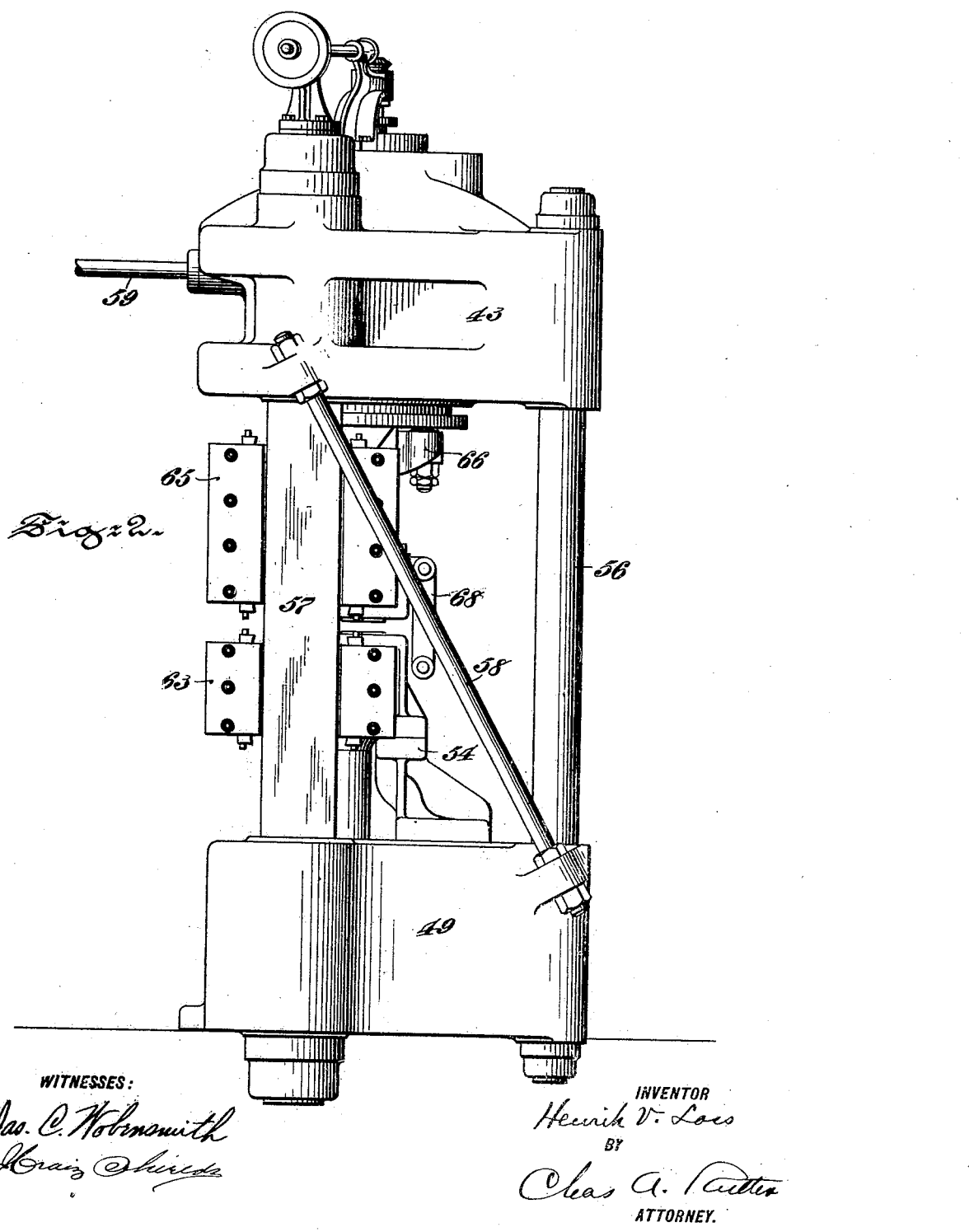
Figure 3:
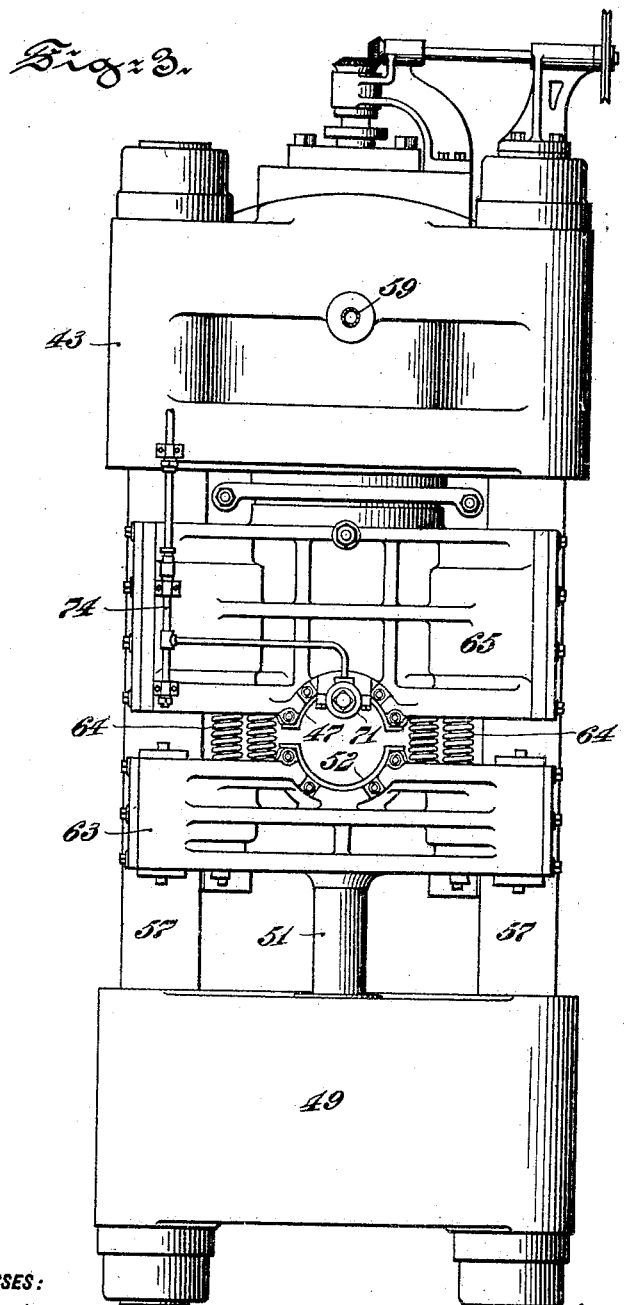
Figure 4:
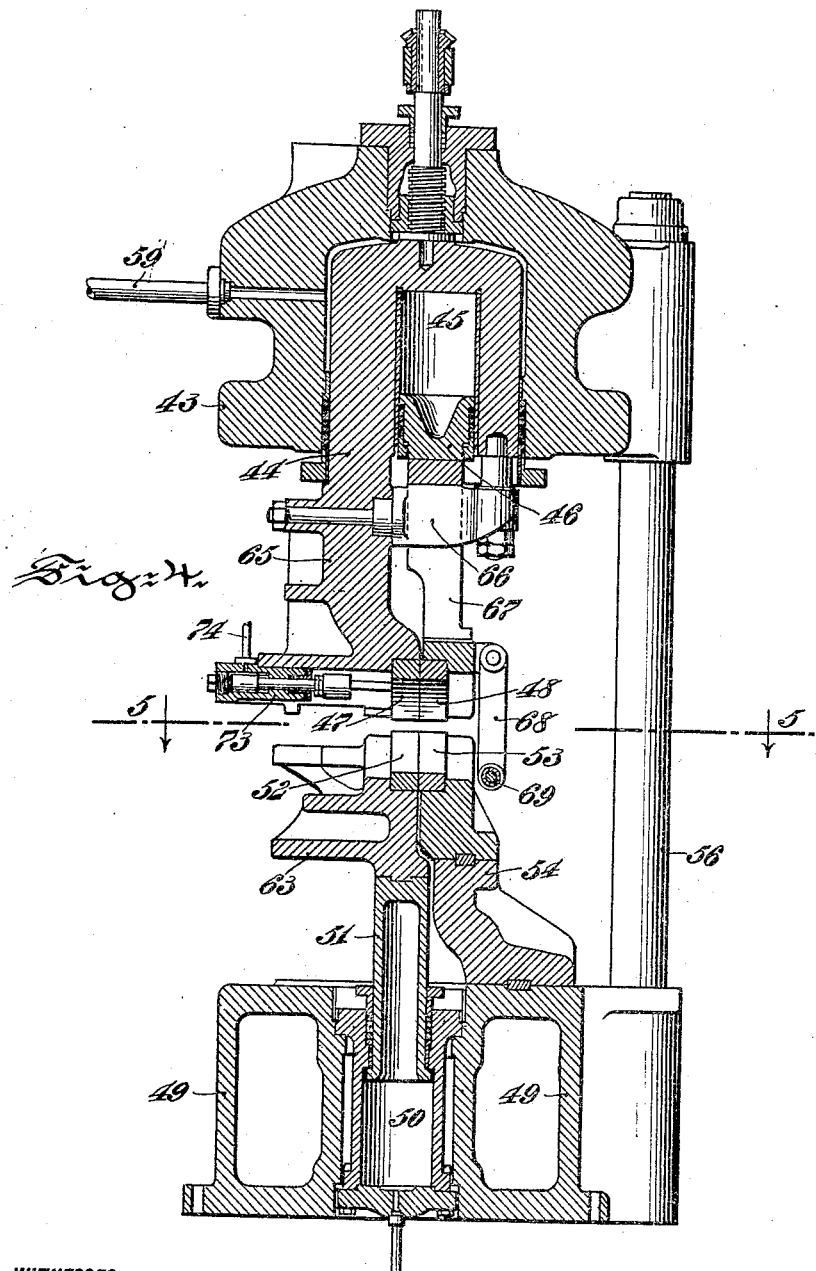
Figure 5:
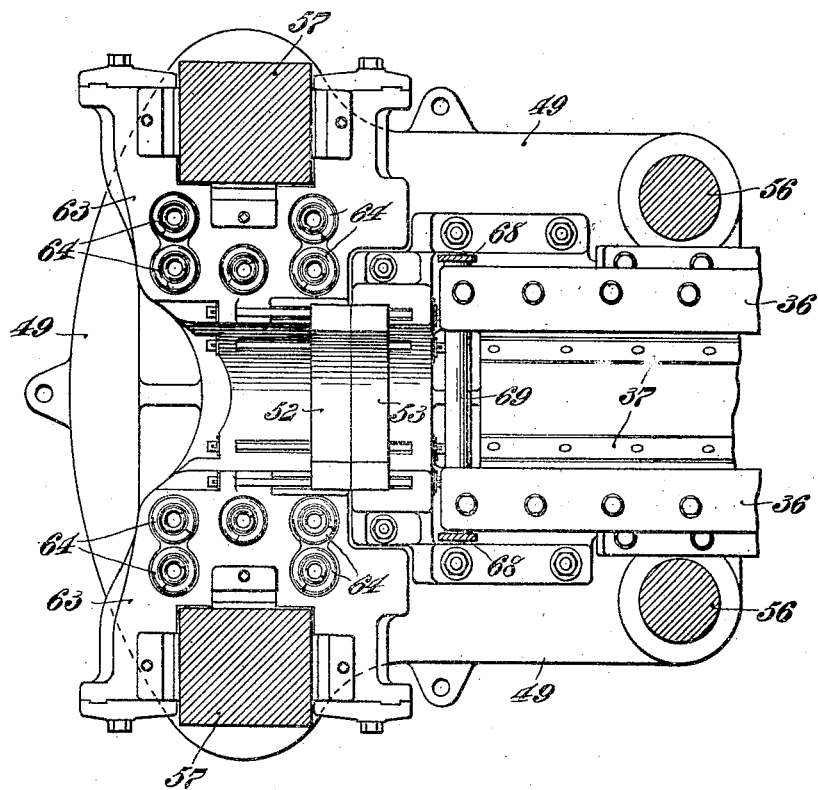

In the accompanying drawings forming part of this specification and in which similar letters of reference indicate similar parts throughout the several views:—Figure 1, is cluding the means for carrying and for feeding the article to be sheared thereto; Fig. 2, a side elevation, upon an enlarged scale, of the shearing machine proper; Fig. 3, a front elevation of Fig. 2; Fig. 4, a vertical central sectional elevation through the shearing machine proper; Fig. 5, a section of Fig. 4 on line 5—5; Fig. 6, a sectional elevation of the telescopic liquid feeding means for the holdback cylinder, Fig. 8; Fig. 7, a central sectional elevation through part of the main cylinder and through part of its piston and through part of the clamping piston carried by the main piston, showing the arrangement of the means for feeding liquid to latter piston; Fig. 8, a central sectional elevation through hold-back cylinder or stop; Fig. 9, a side elevation, on an enlarged scale, of the apparatus for carrying and for feeding the metal to the shear; Fig. 10, a front elevation of Fig. 9; Fig. 11, a plan view, partly broken away, of Fig. 9; Fig. 12, a central longitudinal sectional elevation, on an enlarged scale, of Fig. 9; Fig. 13, a section of Fig. 12, on line 13—13; Fig. 14, a section of Fig. 12 on line 14—14; Fig. 15, a section of Fig. 12 on line 15—15; Fig. 16, a section of Fig. 12 on line 16—16.

The ingot, bar, or billet to be sheared is carried by a suitable crane, or other machine, not shown, and is deposited upon the short arm 25 of a tilting table, Figs. 11, 12 and 13, which is carried by trunnions 27 which are supported and turn in suitable bearings in the movable frame 28.

26 is the long arm of the tilting table. The first position of this table is shown by dotted lines in Fig. 12.

29, Fig. 1, 9 & 13, is a pinion fast to one of the trunnions 27, and 30 is a rack gearing into this pinion which rack is carried by the hydraulic piston 31 which works in the cylinder 32. 33 is an hydraulic cylinder the piston 34 of which carries the vertically movable frame 28 which carries the tilting table. The frame 28 is guided in its movements by guides 35 which are carried by the main frame 36 of the feeding device.

The frame 28 being elevated, and the tilting table being in the position indicated by dotted lines in Fig. 12, the article to be operated upon is lowered until its under end rests upon the top of the short arm 25 of the table. The hydraulic piston 31 is now lowknown means and the rack 30 being lowered with the piston will turn the pinion 29 which will turn the trunnions 27 of the tilting table until the arm 26 thereof assumes the horizontal position shown by the full lines in Fig. 12. The article carried by this table is now in a horizontal position. The next operation is to exhaust the liquid from the cylinder 33 which will cause the piston 34, the movable frame 28 carried by this piston, and the tilting table, which is carried by frame 28, to fall lowering the article carried by the table until it rests upon the tracks or guides 37, which are carried by the frame 38 which is carried by or forms part of the main frame 36 of the feeding device. After the article to be sheared is deposited on the tracks 37 the frame 28 continues to fall until the arm 25 of the tilting table is lowered beneath the bottom of the article to be sheared, which is now carried on the tracks.

39, Figs. 1, 9, 11, 12, is an hydraulic cylinder, the piston 40 of which is secured to a cross head 41, which is guided in grooves 42 in the frames 36—38. The piston 40 is operated hydraulically in a well known manner to advance the cross head 41' so that it will move the article carried by the tracks 37 to the shearing machine proper, or in a reverse direction to retract the cross head after its stroke is completed.

In Fig. 10 an ingot, indicated in broken lines, is shown supported on the tracks 37.

I will now describe the shear proper: 43, Figs. 1, 2, 3 and 4, is a casting which is bored out to form an hydraulic cylinder which is fitted with a piston 44 which is packed in the usual manner which will not need description. The piston 44 is bored out to form a cylinder 45 which is furnished with a piston 46 also packed in a well known manner. The piston 44 carries on its lower end a part 47 of a two part clamp, and the piston 46 carries on its end a part 48 of another two part clamp. These clamps are best shown in Fig. 4. For convenience of description I will hereinafter call the clamp of which 47 is part the shearing clamp, and the clamp of which 48 is a part the holding clamp.

49 is the base of the machine in which is formed, or which carries, an hydraulic cylinder 50 which is furnished with a piston 51 which carries the part 52 of the shearing clamp, which acts in line and in conjunction with the part 47 carried by the piston 44.

53 is a part of the holding clamp which is in line and acts in conjunction with the part 48 carried by the piston 46. The part 53 of the holding clamp is carried by a casting 54 which is carried by the base casting 49.

The upper cylinder casting 43 is carried by the base casting through rods 56 and columns 57 which are of such dimensions as to insure the alinement and integrity of the machine under all conditions of service.

58 are diagonal tie rods which assist in stiffening the machine.

The article to be sheared is passed in over the clamp parts 52—53 and under the clamp parts 47—48, and liquid under pressure is admitted, through a suitable duct 59, to the cylinder 43 causing the piston 44 to fall. The cylinder 45 having in it always a liquid under the constant working pressure, the downward motion of piston 44 will carry with it the piston 46, and the clamp parts 47—48 will engage the top of the article to be sheared. After the clamp parts 47—48 engage the article they, as well as the clamping parts 52—53, are sunk therein, the parts 47—52 by the downward action of the piston 44 operating against the constant pressure in the cylinder 50, the parts 48—53 by the action of the piston 46 which is actuated by the liquid as above described. The piston 44 now continues its stroke and as the lower member 52 of the shearing clamp is supported upon the piston 51 the downward movement of the upper member 47 of this clamp will push this piston downwards because the diameter and working strength of piston 44 is greater than the diameter and resistance of piston 51, and the metal will be sheared off along a line coinciding with that formed by the adjacent faces of the clamp parts 47—52 and 48—53. During this latter part of the operation the piston 46 is left behind; space being allowed in the cylinder 45 above the piston 46 sufficiently long to take up the shearing stroke of piston 44.

The purpose of sinking the clamp parts into the metal is that they may form a barrier to prevent the flow of metal through the clamps during the shearing. The clamping itself not only checks the flow by setting up a great friction but by sinking the clamps into the metal its flow would be further checked because the clamps form an offset in the line of flow, thus forcing a change of direction.

In Fig. 7 the arrangement for introducing liquid to the cylinder 45 is shown. 70 is a pipe passing through cylinder 43 and entering the piston 44, the longitudinal axis of the pipe 70 being parallel to that of the piston 44. 60 is a tube closed at the bottom, and of somewhat greater diameter than that of pipe 70, which is carried by the piston 44, the wall of which is bored out to receive it, and which is properly packed at the top and bottom. Through the top packing 61 the pipe 70 passes. 62 is a duct leading from tube 60 to the top of the cylinder 45. Liquid is introduced through pipe 70 to the tube 60 from which it can pass to the cylinder 45. The exhaust takes place, in a reverse direction, through the same ducts. The arrangement shown forms a convenient telescopic joint made necessary by the movements of the piston 44.

The clamp member 52 is connected with a cross head 63 which is guided in its movements by the columns 57. The cross head and columns are massive in construction so that there will be no danger of the machine springing during its operation.

64 are springs, of the helical variety preferably, which are carried by the cross head 63 the office of which is to engage and lift the top cross head 65 which forms part of piston 44—after the piston 51 has arrived at its full upward stroke in the cylinder 50 during the return movement which takes place after the completion of the shearing stroke when the water is exhausted from cylinder 43 back to the pipe 59 through a suitable valve. The springs 64 become compressed on the downward motion of the piston 44 and the energy thus stored is used to lift the clamp piece 47, 48 clear of the ingot so as to permit the same to be pushed forward for the next shearing operation.

The lifting of the clamps 47—48 is accomplished by these springs acting upon the cross head 65 which carries the clamp 47 and the supporting beam 66 which again lifts piston 46 which carries the clamp 48 through the intermediary piece or pieces 67.

The lifting of the clamp member 48 carries with it the links 68 which carry a bottom cross piece 69 which engages the under side of the ingot being fed to the machine lifting it clear and out of engagement with the lower clamps 52—53, so as to enable the ingot to be pushed forward for the next operation by the movement of the piston 40 in the cylinder 39.

The article to be sheared is fed to the stationary and shearing clamps by step by step movements of the piston 40. The distance that this article is fed at each movement can be regulated by the length of this movement or a hold back or stop carried by the cross head 65 may be used for gaging the length of the piece to be cut off. The stop 71 that I have illustrated in Figs. 3 and 8 is adjustably secured to a piston 72 which is carried by an hydraulic cylinder 73, which through a telescopic arrangement of pipes 74 shown in Figs. 3 and 6, made necessary by the piston being carried by the movable cross head 65, is connected liquid supply of the cylinder 43.

Having thus described my invention I claim as new and desire to secure by Letters Patent:

1. In a shearing machine, in combination, a main cylinder, means for admitting and for withdrawing a liquid under pressure to and from said cylinder, a piston within said cylinder furnished with an arm carrying one member of a shearing clamp and being itself bored out to form a second cylinder, said shearing clamp member, a piston carried in said second cylinder furnished with an arm carrying the movable member of a holding clamp, said holding clamp member, means for admitting and for withdrawing a liquid under pressure to and from said latter cylinder, a movable shearing clamp member in line with the first mentioned shearing clamp member, and a stationary clamp member in line with the movable holding clamp member.

2. In a shearing machine, in combination, a set of movable shearing clamps, a hydraulically operated piston, bored out to form a cylinder, for operating said clamps, a movable holding clamp carried by a piston working in the cylinder formed in said first cylinder, said second piston, a beam or stop carried by the first piston engaging said second piston in its lowered position, a stationary holding clamp member in line with the movable holding clamp member, and means for returning said movable clamp members to their first, or open, position upon the completion of the shearing stroke of the machine.

3. The combination with the movable member of the holding clamp, of links, and a bar or roller carried by said links adapted upon the upward movement of said clamp member to engage and lift the article being fed to said clamp.

4. The combination with the main hydraulic cylinder, the cylinder forming piston of said cylinder, and the piston carried by said cylinder forming piston, of a tube carried by said main cylinder, a tube open at the top and closed at the bottom carried by said piston of said cylinder, a duct connecting said latter tube and the cylinder in said piston, and a packing for making a tight joint between said tubes, said tubes operating telescopically the one with the other, substantially as set forth.

5. The combination with the holding and the shearing clamps of a shearing machine, and means for operating said clamps, of a frame for carrying the article to be sheared, a tilting table carried rotatably by a frame movable vertically of said first frame, said movable frame, means for rocking said tilting table upon its supports, means for elevating or depressing said frame carrying table, and means for advancing the article to be sheared along said frame.

6. In a feeding means for shearing machines, in combination, a main frame, a frame movable vertically of said main frame, a tilting table carried by a shaft or trunnions carried in bearings carried by said main frame, a pinion fast to said shaft or trunnion, a rack gearing into said pinion, a hydraulically operated piston carrying said rack, a cylinder in which said piston works, an hydraulically operated piston and cylinder for carrying said movable frame, and means operating lengthwise of said main frame for moving the article to be sheared to the shearing machine.

7. In a feeding means for shearing machines, in combination, a main frame for carrying horizontally the article to be sheared, a frame movable vertically of said main frame, a tilting table rotatably carried by said movable frame and adapted to receive and deposit on said main frame the article to be sheared, means for rocking said tilting table, and means for lowering said table and its carrying frame clear of the article to be sheared when lying on the main frame.

HENRIK V. LOSS.

Witnesses:
HENRY J. REBMAN,
CHARLES A. RUTTER.